United States Patent
Chae et al.

(10) Patent No.: US 11,153,888 B2
(45) Date of Patent: Oct. 19, 2021

(54) METHOD FOR SELECTING CARRIER FOR DIRECT COMMUNICATION BETWEEN USER EQUIPMENTS IN MULTI-CARRIER COMMUNICATION SYSTEM, AND DEVICE THEREFOR

(71) Applicant: LG Electronics Inc., Seoul (KR)

(72) Inventors: Hyukjin Chae, Seoul (KR); Hanbyul Seo, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/497,166

(22) PCT Filed: Mar. 23, 2018

(86) PCT No.: PCT/KR2018/003503
§ 371 (c)(1),
(2) Date: Sep. 24, 2019

(87) PCT Pub. No.: WO2018/174671
PCT Pub. Date: Sep. 27, 2018

(65) Prior Publication Data
US 2020/0107330 A1    Apr. 2, 2020

Related U.S. Application Data

(60) Provisional application No. 62/475,867, filed on Mar. 24, 2017, provisional application No. 62/587,461, filed on Nov. 16, 2017.

(51) Int. Cl.
*H04W 72/08* (2009.01)
*H04L 12/24* (2006.01)
(Continued)

(52) U.S. Cl.
CPC ....... *H04W 72/085* (2013.01); *H04L 41/0803* (2013.01); *H04W 24/08* (2013.01); *H04W 64/00* (2013.01)

(58) Field of Classification Search
None
See application file for complete search history.

(56) References Cited

U.S. PATENT DOCUMENTS

2016/0119792 A1    4/2016  Cheng et al.
2016/0219620 A1    7/2016  Lee et al.
(Continued)

FOREIGN PATENT DOCUMENTS

KR    1020160036947    4/2016
KR    1020160149282    12/2016

OTHER PUBLICATIONS

Extended European Search Report in European Appln. No. 18770924.1, dated Nov. 9, 2020, 10 pages.
(Continued)

*Primary Examiner* — Jeffrey M Rutkowski
*Assistant Examiner* — Chae S Lee
(74) *Attorney, Agent, or Firm* — Fish & Richardson P.C.

(57) ABSTRACT

Disclosed in the present application is a method for a user equipment to select a carrier for performing sidelink communication in a multi-carrier communication system. The method comprises: a step of measuring, for each of a plurality of carriers, a channel busy ratio (CBR), which is the ratio between the entire resources of the carrier and a resource thereof pre-used during a predetermined time period, and a channel occupancy ratio (CR), which indicates the amount of a resource used by a user equipment on the carrier during the predetermined time period; a step of setting up, for the each of the plurality of carriers, a selectable carrier aggregation on the basis of a difference value between a CR limit value of each carrier and the measured CR thereof; and a step of performing sidelink communication by means of the carrier, of the carrier aggregation, which has the minimum measured CBR.

12 Claims, 10 Drawing Sheets

Measure CBR and CR for each of a plurality of carriers (S1101)

Configure a selectable carrier set based on difference between CR limit for each carrier and measured CR (S1103)

Perform the sidelink communication through carrier having the minimum measured CBR in the carrier set (S1105)

(51) Int. Cl.
  *H04W 24/08* (2009.01)
  *H04W 64/00* (2009.01)

(56) References Cited

U.S. PATENT DOCUMENTS

| | | | | |
|---|---|---|---|---|
| 2018/0048572 A1* | 2/2018 | Gulati | ..................... | H04L 47/24 |
| 2018/0124771 A1* | 5/2018 | Mok | ................. | H04W 36/0072 |
| 2019/0313279 A1* | 10/2019 | Li | ..................... | H04W 28/0289 |
| 2020/0029245 A1* | 1/2020 | Khoryaev | ............... | H04W 4/46 |

OTHER PUBLICATIONS

ZTE. R2, "CR for the V2X sidelink communication in 36.300," R2-1703073, 3GPP TSG RAN WG2 #97bis, Spokane, USA, Apr. 3-7, 2017, 10 pages.

International Search Report and Written Opinion in PCT Application No. PCT/KR2018/003503, dated Jun. 20, 2018, 18 pages (with English translation).

Catt (rapporteur), "Summary of [96#63][LTE/V2X]—CBR," R2-1701246, 3GPP TSG-RAN WG2 Meeting #97, Athens, Greece, Feb. 13-17, 2017, 21 pages.

LG Electronics, "Discussion on UE behavior in congestion control," R1-1611741, 3GPP TSG RAN WG1 Meeting #87, Reno, US, Nov. 14-18, 2016, 4 pages.

3rd Generation Partnership Project; Technical Specification Group Radio Access Network, "Evolved Universal Terrestrial Radio Access (E-UTRA); Physical layer; Measurements (Release 14)," 3GPP TS 36.214 V14.2.0, dated Mar. 23, 2017, 24 pages.

3rd Generation Partnership Project; Technical Specification Group Radio Access Network, "Evolved Universal Terrestrial Radio Access (E-UTRA); Radio Resource Control (RRC); Protocol specification (Release 14)," 3GPP TS 36.331 V14.2.0, dated Mar. 23, 2017, 723 pages.

KR Notice of Allowance in Korean Appln. No. 10-2019-7028163, dated Apr. 30, 2021, 4 pages (with English translation).

Qualcomm Incorporated, "Measurement metric for congestion control," R1-166259, 3GPP TSG-RAN WG1 #86, Gothenburg, Sweden, dated Aug. 22-26, 2016, 9 pages.

Samsung, "ENB-assisted Congestion Control," R2-1701281, 3GPP TSG-RAN WG2 Meeting #97, Athens, Greece, dated Feb. 13-17, 2017, 4 pages.

\* cited by examiner

(A) CONTROL-PLANE PROTOCOL STACK (B) USER-PLANE PROTOCOL STACK

METHOD FOR SELECTING CARRIER FOR DIRECT COMMUNICATION BETWEEN USER EQUIPMENTS IN MULTI-CARRIER COMMUNICATION SYSTEM, AND DEVICE THEREFOR

CROSS-REFERENCE TO RELATED APPLICATIONS

This application is the National Phase of PCT International Application No. PCT/KR2018/003503, filed on Mar. 26, 2018, which claims the benefit of U.S. Provisional Application No. 62/475,867, filed on Mar. 24, 2017, and 62/587,461, filed on Nov. 16, 2017, which are all hereby incorporated by reference herein in their entirety.

TECHNICAL FIELD

The present invention relates to a wireless communication system, and more particularly, to a carrier selection method for direct communication between user equipments in a multi-carrier communication system, and a device therefor.

BACKGROUND ART

3GPP LTE (3rd generation partnership project long term evolution hereinafter abbreviated LTE) communication system is schematically explained as an example of a wireless communication system to which the present invention is applicable.

Figure 1:
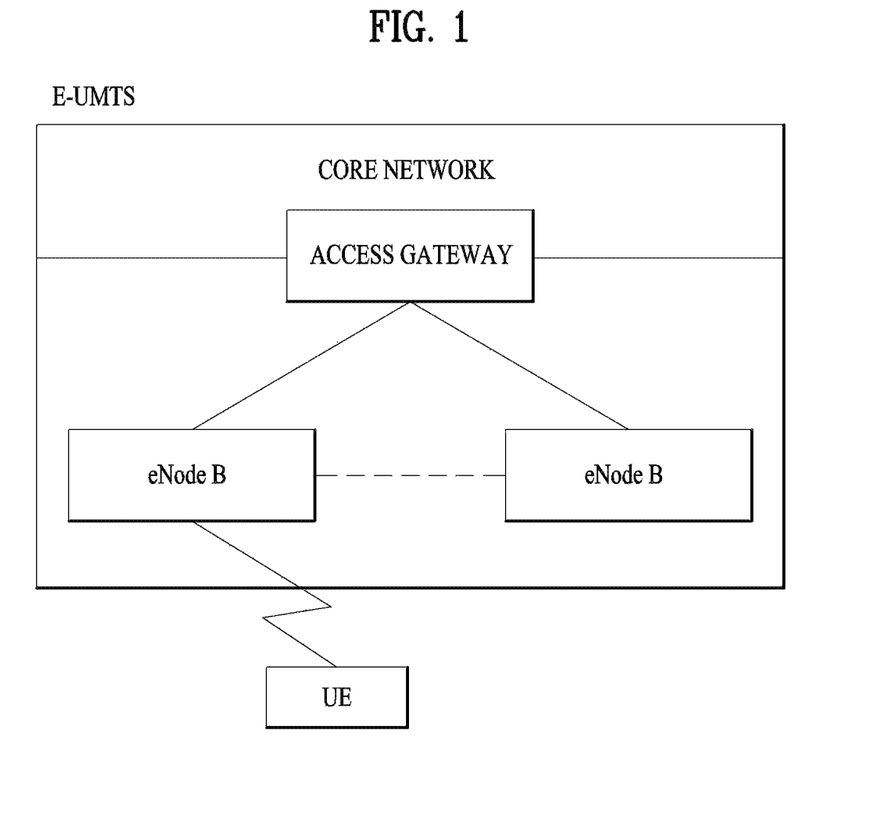
FIG. 1 illustrates a configuration of an Evolved Universal Mobile Telecommunications System (E-UMTS) network as an example of a wireless communication system.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for future competitiveness.

DISCLOSURE

Technical Problem

Based on the discussion above, a carrier selection method for direct communication between user equipments in a multi-carrier communication system and a device therefor are provided.

Technical Solution

In one aspect of the present invention, provided herein is a method for selecting, by a terminal, a carrier for sidelink communication in a multi-carrier communication system, the method including measuring, for each of a plurality of carriers, a channel busy ratio (CBR) representing a ratio of entire resources of a corresponding carrier and resources already used for a predetermined period, and a channel occupancy ratio (CR) representing the amount of resources used by the terminal on the corresponding carrier during the predetermined period, configuring, for each of the plurality of carriers, a set of selectable carriers based on a difference between the CR limit for each carrier and the measured CR, and performing the sidelink communication through a carrier having the minimum measured CBR in the carrier set.

In another aspect of the present invention, provided herein is a terminal for performing sidelink communication in a multi-carrier communication system, including a wireless communication module, and a processor connected to the wireless communication module, wherein the processor is configured to measure, for each of a plurality of carriers, a channel busy ratio (CBR) representing a ratio of entire resources of a corresponding carrier and resources already used for a predetermined period, and a channel occupancy ratio (CR) representing the amount of resources used by the terminal on the corresponding carrier during the predetermined period, configure, for each of the plurality of carriers, a set of selectable carriers based on a difference between the CR limit for each carrier and the measured CR, and perform the sidelink communication through a carrier having the minimum measured CBR in the carrier set.

Herein, the measured CR may be a CR average value of the plurality of resource pools configured for the corresponding carrier. Alternatively, the measured CR is a CR average of resource pools available at a location of the terminal among a plurality of resource pools configured for the corresponding carrier.

The selectable carrier set may be configured with carriers having a difference between the CR limit for each carrier and the measured CR greater than or equal to a threshold.

Herein, information about the CR limit for each carrier and the threshold may be pre-received from a network.

Advantageous Effects

According to an embodiment of the present invention, carrier selection for direct communication between user equipments in a multi-carrier communication system may be performed efficiently.

It will be appreciated by persons skilled in the art that that the effects that can be achieved through the present invention are not limited to what has been particularly described hereinabove and other advantages of the present invention will be more clearly understood from the following detailed description.

BEST MODE

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

Figure 2:
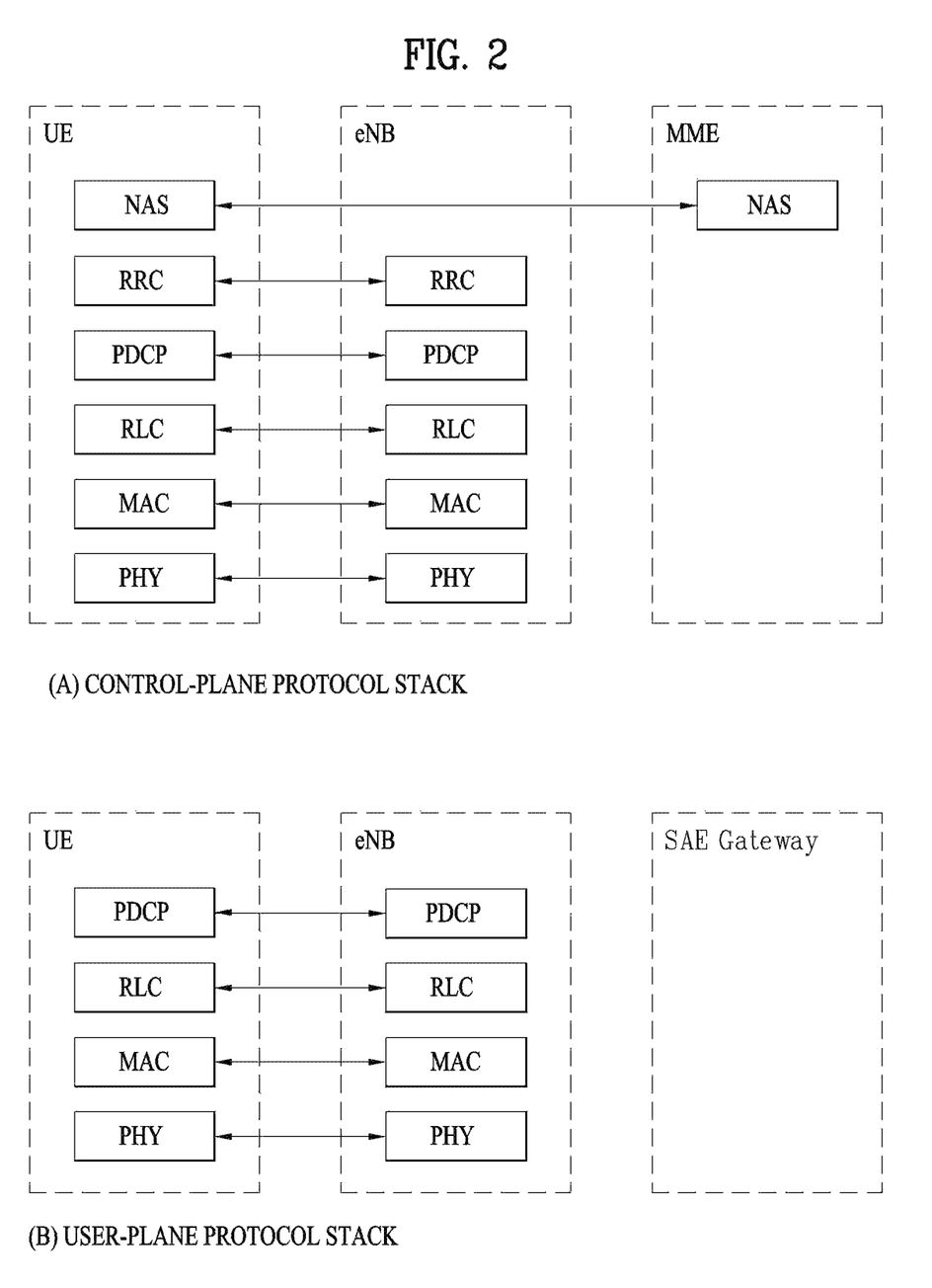
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

One cell constituting an eNB is configured to use one of bandwidths of 1.25, 2.5, 5, 10, 15, and 20 MHz and provides a DL or UL transmission service to multiple UEs. Different cells may be configured to provide different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
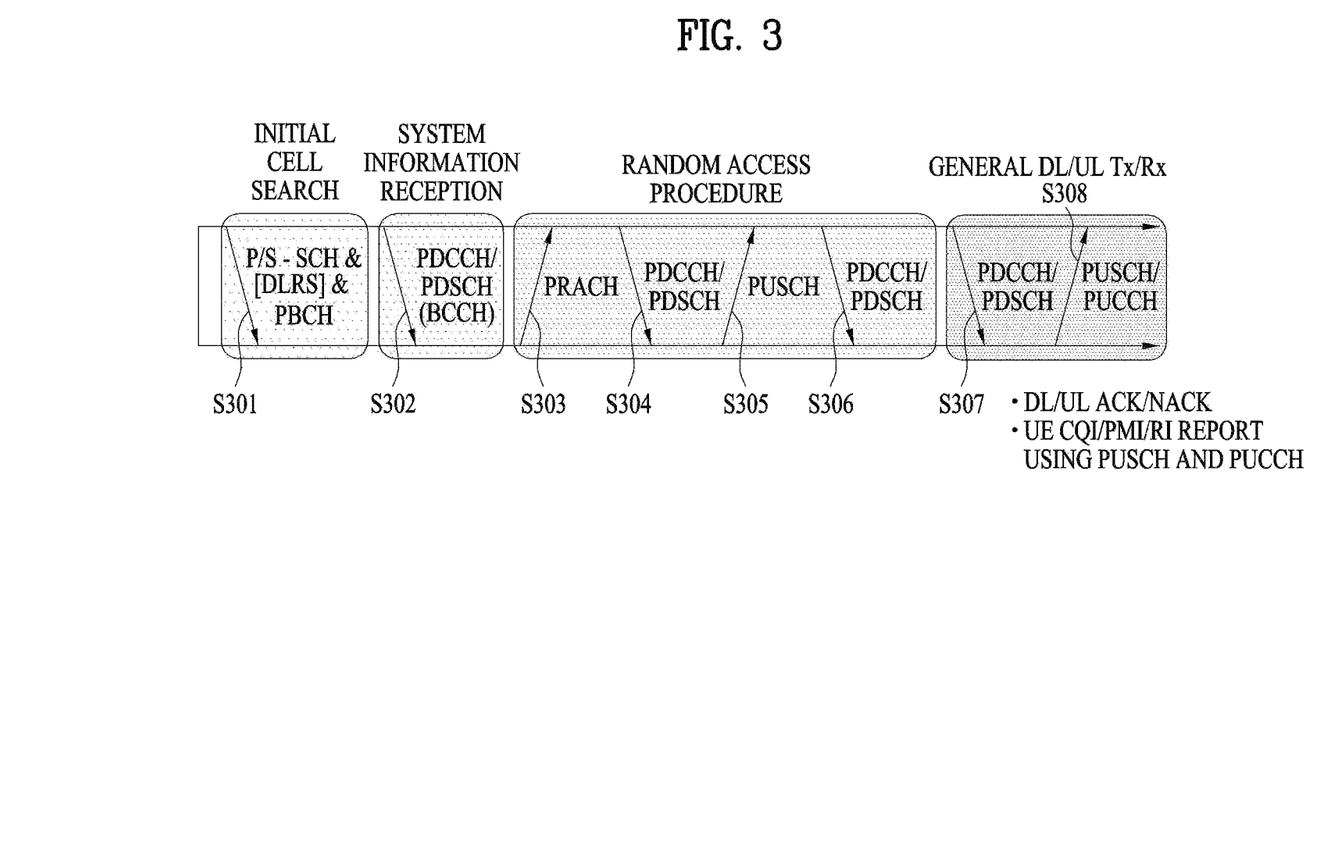
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
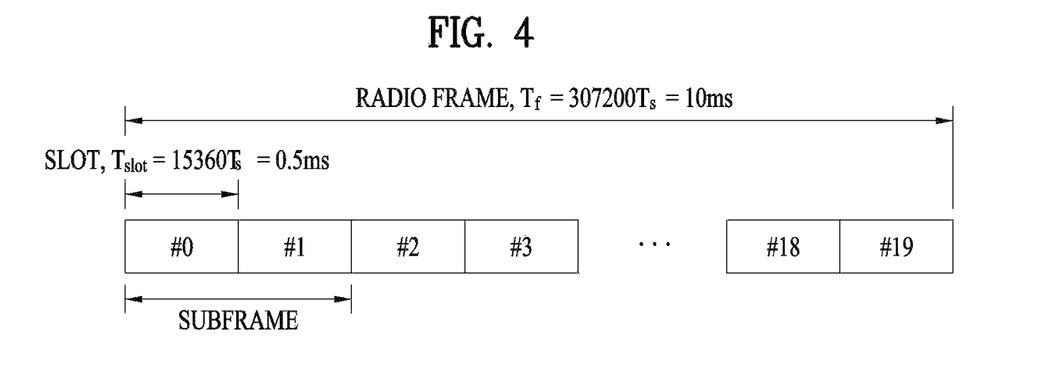
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
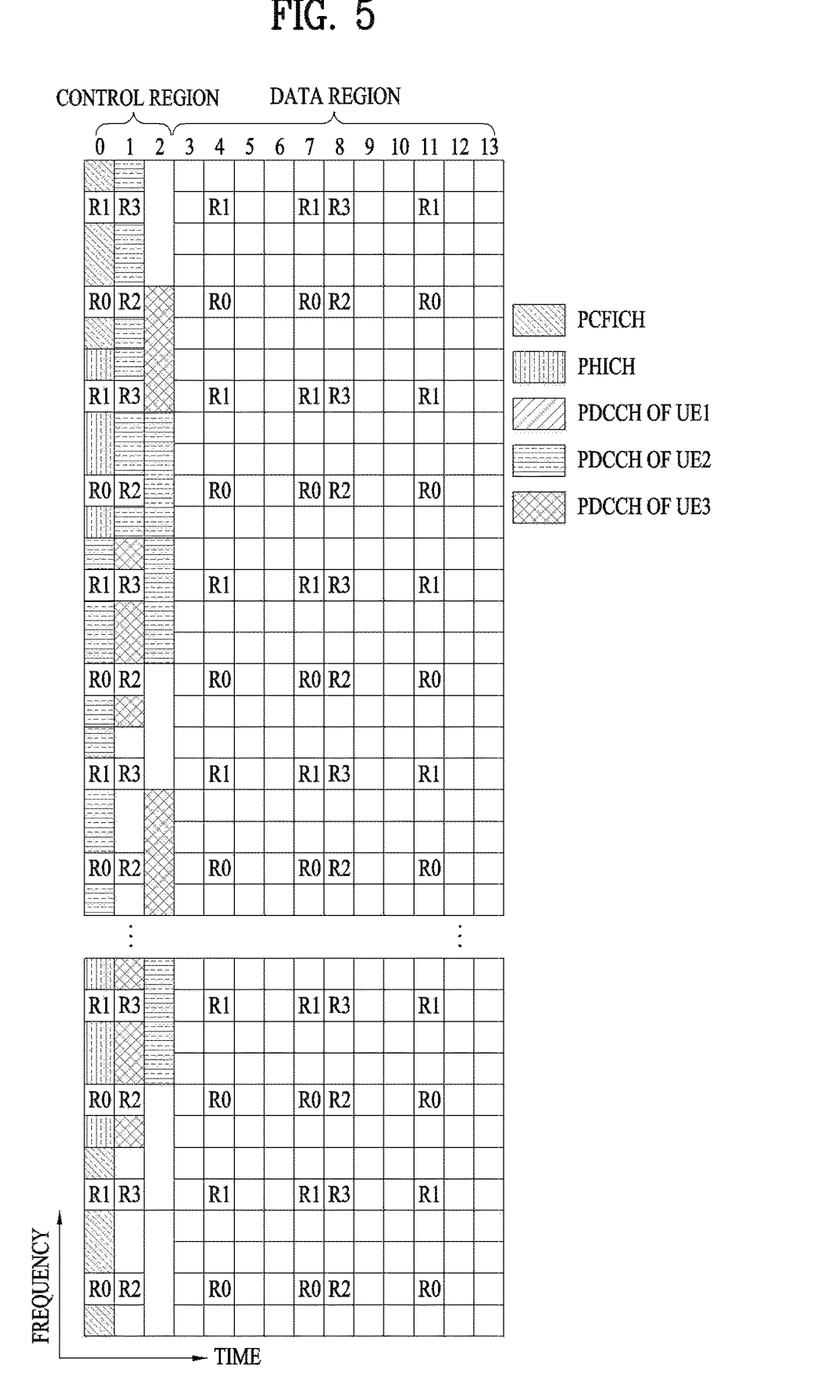
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A"

and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
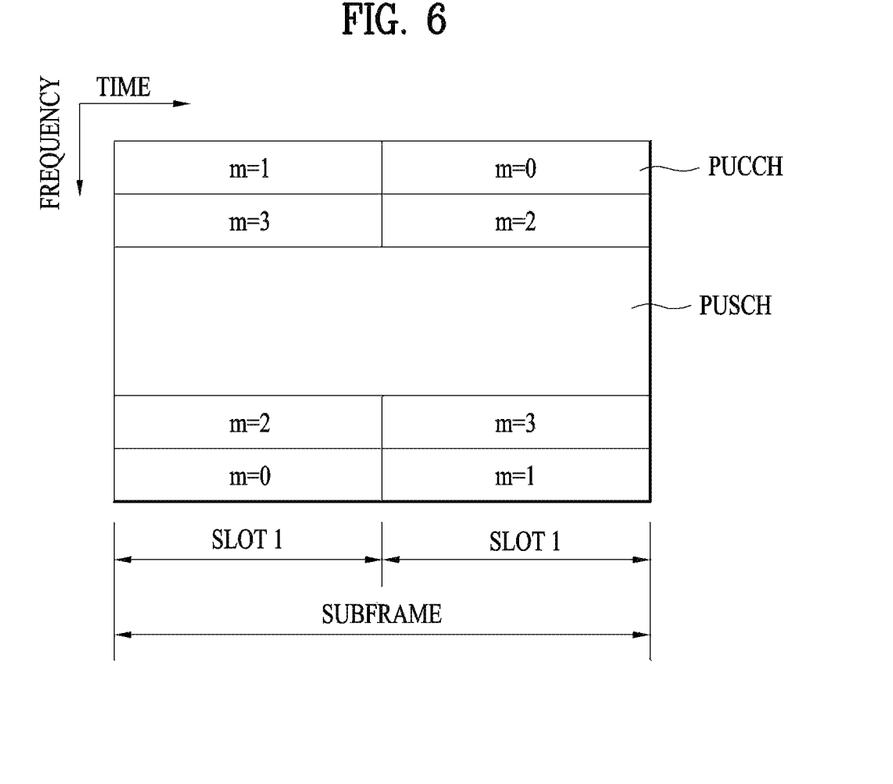
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Figure 7:
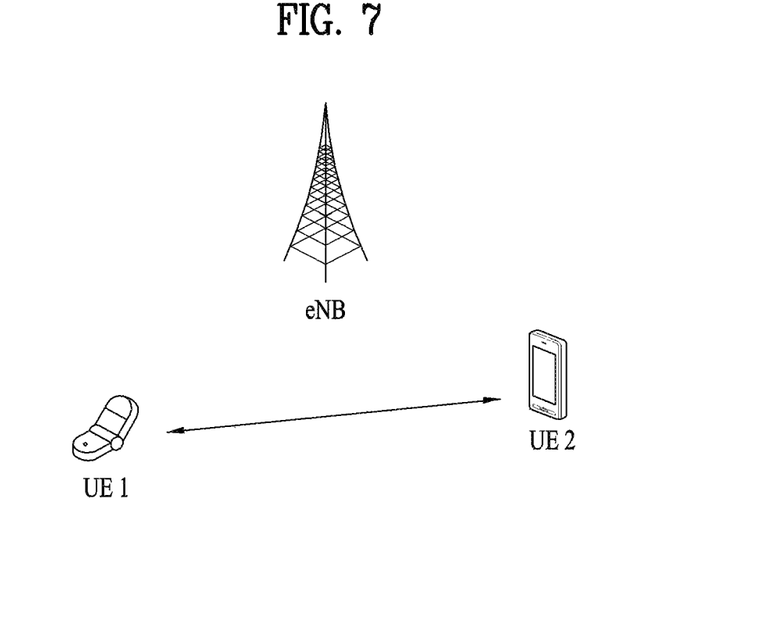
FIG. 7 is a diagram illustrating the concept of device-to-device (D2D) communication.

FIG. 7 is a diagram illustrating the concept of device-to-device (D2D) communication.

Referring to FIG. 7, during D2D communication (i.e., D2D direct communication) in which the UE wirelessly communicates with another UE, the eNB may transmit a scheduling message for indicating D2D transmission/reception. Hereinafter, a link between UEs is referred to as a D2D link and a link for communication between a UE and an eNB is referred to as an SideLink (SL) in the concept compared with an uplink or a downlink.

A UE participating in sidelink communication receives a sidelink scheduling message from an eNB and performs a transmission/reception operation indicated by the sidelink scheduling message. Here, the UE refers to a terminal of a user. However, when a network entity such as an eNB transmits and receives a signal according to a communication scheme between the UEs, it may also be regarded as a kind of UE. In addition, the eNB may receive a sidelink signal transmitted by the UE, and a signal transmission/reception method for the UE designed for sidelink transmission is applicable even to an operation in which the UE transmits an uplink signal to the eNB.

In order to perform the sidelink operation, the UE first performs a discovery operation to determine whether the counterpart UE with which the UE intends to perform sidelink communication is located in a nearby area where sidelink communication can be performed. The discovery operation is performed in a manner in which each UE transmits its own discovery signal for identification thereof, and a neighboring UE detecting the signal determines that the UE transmitting the discovery signal is located in an adjacent position. That is, each UE checks whether a counterpart UE with which sidelink communication is to be performed is located at an adjacent position through the discovery operation, and then performs sidelink communication for actually transmitting and receiving user data.

Described in the following is a case for a UE1 to select a resource unit corresponding to a specific resource from a resource pool, which means a set of a series of resources, and transmit a sidelink signal using the corresponding resource unit. Here, the resource pool may be announced by a base station if the UE1 is located within the coverage of the base station. If the UE1 is located out of the coverage of the base station, the resource pool may be announced by another UE or determined as a predetermined resource. Generally, a resource pool is configured with a plurality of resource units, and each UE may select one or a plurality of resource units and then use the selected resource unit(s) for a sidelink signal transmission of its own.

Figure 8:
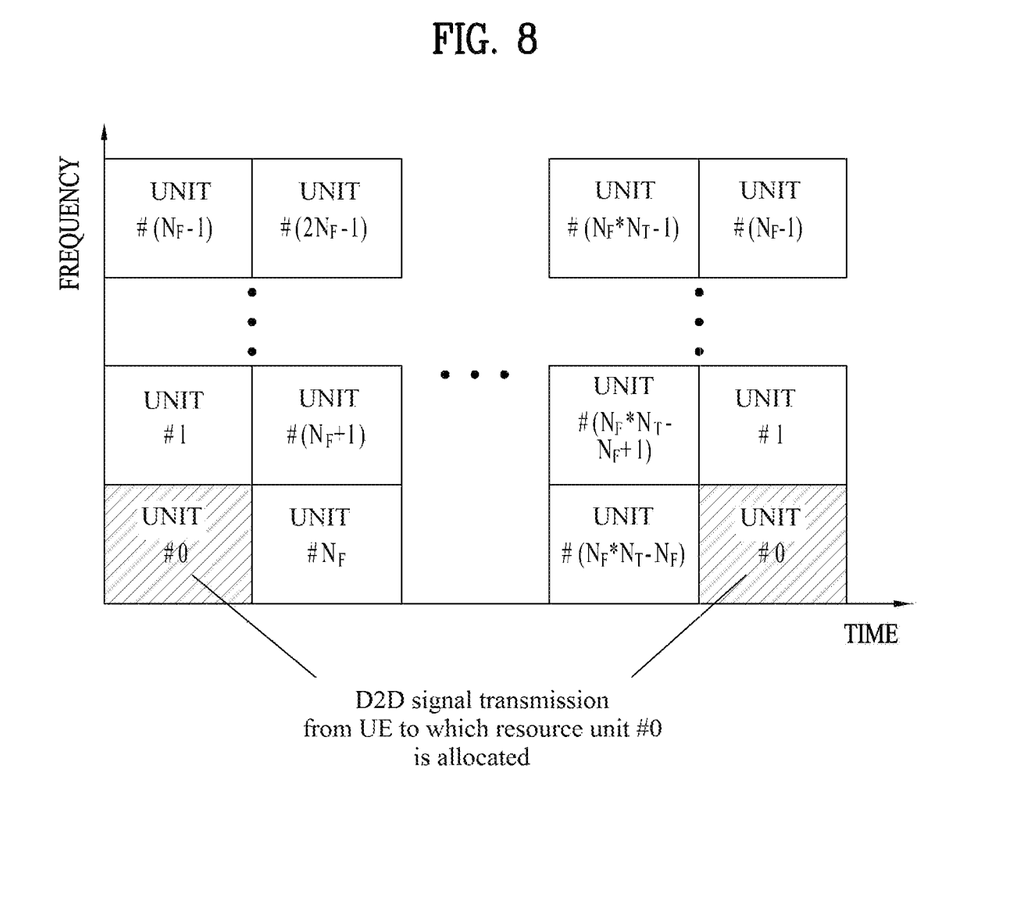
FIG. 8 illustrates an exemplary configuration of a resource pool and a resource unit.

FIG. 8 shows a configuration example of a resource pool and a resource unit.

Referring to FIG. 8, an entire frequency resource is divided into $N_F$ and an entire time resource is divided into $N_T$, whereby total $N_F*N_T$ resource units can be defined. Particularly, a corresponding resource pool may be repeated by period of $N_T$ subframes. Typically, a single resource unit may appear periodically and repeatedly. Or, in order to obtain a diversity effect in a time or frequency dimension, an index of a physical resource unit having a single logical resource unit mapped thereto may change in a previously determined pattern according to time. In such a resource unit structure, a resource pool may mean a set of resource units that can be used for a transmission by a UE intending to transmit a sidelink signal.

The above-described resource pool may be subdivided into various types. First of all, it can be classified according to a content of a sidelink signal transmitted on a resource pool. For example, like 1) to 4) in the following, a content of a sidelink signal may be classified into a sidelink data channel and a discovery signal. And, a separate resource pool may be configured according to each content.

1) Scheduling Assignment (SA): This refers to a signal including resource location information of a sidelink data channel followed by a transmitting (Tx) UE and information such as Modulation and Coding Scheme (MCS) for demodulation of a data channel, an MIMO transmission scheme and the like. The SA can be transmitted in a manner of being multiplexed with sidelink data on the same resource unit. In this case, an SA resource pool may mean a pool of resources on which SA is transmitted by being multiplexed with sidelink data.

2) Sidelink data channel: This refers to a channel used for a Tx UE to transmit user data. If SA is transmitted by being multiplexed with sidelink data on a same resource unit, a Resource Element (RE) used in transmitting SA information on a specific resource unit of an SA resource pool may be used to transmit sidelink data on a sidelink data channel resource pool.

3) Discovery signal: This means a resource pool for a signal enabling a neighboring UE to discover a Tx UE in a manner that the Tx UE transmits information such as its own ID and the like.

4) Synchronization signal/channel: This may be referred to as a sidelink synchronization signal or a sidelink broadcast channel, and mean a resource pool for a signal/channel for a receiving (Rx) UE to achieve a goal of matching time/frequency synchronization with a Tx UE in a manner that the Tx UE transmits a synchronization signal and information relevant to synchronization.

In the millimeter wave (mmW) band, which is recently discussed, the wavelength is short, and thus a plurality of antenna elements can be installed in the same area. Specifically, in the 30 GHz band, the wavelength is 1 cm, and a total of 64 (8×8) antenna elements at 0.5 lambda (wavelength) intervals in a 2-dimensional (2D) array can be installed on a panel of 4 by 4 cm. Therefore, a recent trend in the mmW field is to attempt to increase the coverage or enhance the throughput by increasing the beamforming gain using a plurality of antenna elements.

In this case, when each antenna element has a transceiver unit (TXRU) for adjusting the transmit power and phase thereof, each antenna element may perform independent beamforming per frequency resource. However, installing TXRUs in all the about 100 antenna elements is less feasible in terms of cost. Therefore, a method of mapping a plurality of antenna elements to one TXRU and adjusting the direction of a beam using an analog phase shifter has been considered. However, the analog beamforming method like this is disadvantageous in that only one beam direction is generated over the full band and thus frequency selective beamforming is allowed.

A hybrid BF having B TXRUs, which is fewer than Q antenna elements, may be considered as an intermediate form between digital BF and analog BF. In this case, although there is a difference in connection scheme between the B TXRU and the Q antenna elements, the number of directions in which beam can be simultaneously transmitted are limited to be less than or equal to B.

Figure 9:
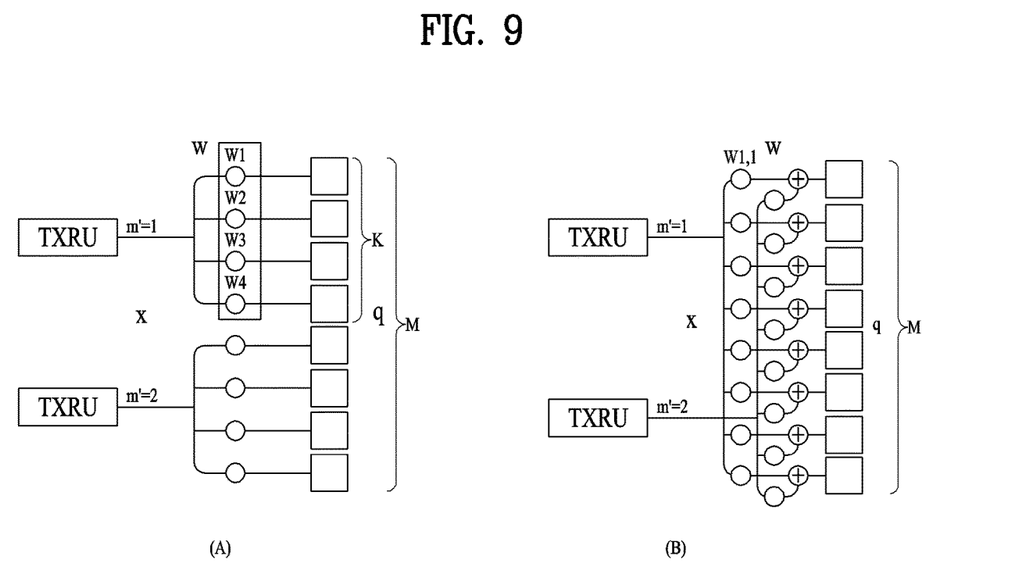
FIG. 9 shows examples of a connection scheme of a TXRU and antenna elements.

FIG. 9 shows examples of a connection scheme of a TXRU and antenna elements.

FIG. 9(A) shows how a TXRU is connected to a sub-array. In this case, antenna elements are connected to only one TXRU. FIG. 9(B) shows how TXRUs is connected to all antenna elements. In this case, the antenna elements are connected to all TXRUs. In FIG. 9, W denotes a phase vector multiplied by an analog phase shifter. That is, the direction of analog beamforming is determined by W. Here, the mapping between the CSI-RS antenna ports and the TXRUs may be 1-to-1 mapping or 1-to-many mapping.

As more communication devices demand larger communication capacities, there is a need for improved wireless broadband communication compared to the conventional radio access technology (RAT). In addition, massive Machine Type Communications (MTC), which connects multiple devices and objects to provide various services anywhere and anytime, is also one of the major issues to be considered in next-generation communication. In addition, communication system design considering services/UEs that are sensitive to reliability and latency has been discussed. Introduction of the next-generation RAT, which is referred to as NewRAT for simplicity in the present invention, in consideration of the aforementioned point is under discussion.

Figure 10:
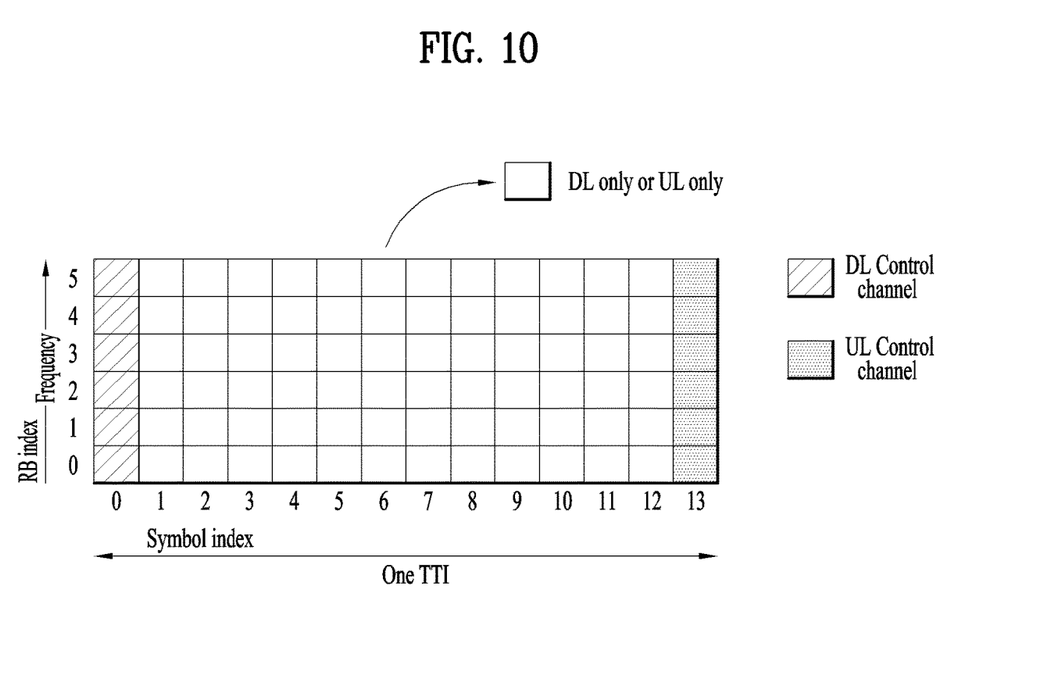
FIG. 10 illustrates an example of a self-contained subframe structure.

In order to minimize data transmission latency in the TDD system, the fifth-generation NewRAT considers a self-contained subframe structure as shown in FIG. 8. FIG. 10 shows an example of a self-contained subframe structure.

In FIG. 10, the hatched area represents a downlink control region and the black portion represents an uplink control region. The unmarked area may be used either for downlink data transmission or for uplink data transmission. The feature of this structure is that downlink transmission and uplink transmission are sequentially performed in one subframe, such that downlink data can be transmitted and uplink ACK/NACK can be received in the subframe. As a result, when a data transmission error occurs, the time taken to retransmit data may be reduced, thereby minimizing the latency of the final data transfer.

In this self-contained subframe structure, a time gap is needed for the BS and the UE to switch from a transmission mode to a reception mode or from the reception mode to the transmission mode. To this end, some OFDM symbols (OSs) at the time of switching from downlink to uplink in the self-contained subframe structure are set to a guard period (GP).

As an example of self-contained subframe types that may be configured/set in a system operating based on NewRAT, at least the following four subframe types may be considered:

Downlink control period+downlink data period+GP+uplink control period;
Downlink control period+downlink data period;
Downlink control period+GP+uplink data period+uplink control period; and
Downlink control period+GP+uplink data period.

Hereinafter, description will be given of a carrier selection method for direct communication between UEs in a multi-carrier communication system and a device therefor according to the present invention will be described based on the discussion above.

In order to select resources in the existing sidelink operation, a UE is defined to measure a channel occupancy ratio (CR) and a channel busy ratio (CBR) for each resource pool. Here, CR refers to the amount or proportion of radio resources that one UE uses for a certain time. In addition, CBR refers to the amount or proportion of radio resources being used for a certain time (e.g., 100 ms).

If a resource pool is not defined across multiple carriers, pools that present on different carriers may simply be considered different pools. In this case, even multiple carriers may simply be considered to perform independent congestion control in multiple pools.

In a system in which multiple carriers/pools are used, the carrier/pool selection of the UE may be performed in consideration of the load of the carriers/pools. For example, the CBR or Received signal strength indicator (RSSI) may be measured for each carrier/pool and used for carrier/pool selection. However, in the case of CR, the measurement for each carrier/pool causes a situation in which switching to a different carrier/pool is inevitable because CR is increased by performing a lot of transmission on a specific carrier/pool. This may cause unnecessary carrier switching or a situation in which a corresponding carrier/pool cannot be used even though the CBR is low. In order to address this issue, the following four approaches are considered.

<First Approach>

It is proposed that the UE sum or commonly evaluate CRs between carriers/pools that provide the same service/application/use or between carriers for which the UE is instructed to add CRs by the network (or pre-indicated carriers), and set CR_limit for the summed CRs.

For example, when two carriers/pools are configured for a Vehicle to Vehicle (V2V) service, the two carriers/pools are evaluated by summing the CRs. This operation is referred to as CR combining between pools or carriers. More specifically, when a CR of 0.01 is evaluated on carrier A and a CR of 0.02 is evaluated on carrier B, the CR of the corresponding UE becomes 0.01+0.02=0.03 and the summed CR is used to adjust a transmission parameter to satisfy the CR_limit. With this method, the CR on a specific carrier may be prevented from increasing as to cause switching to another carrier.

To this end, the network may signal information indicating carriers/pools whose CRs are to be combined through a physical layer or higher layer signal. At this time, CR_limit may also set a carrier/pool-common value. Alternatively, CR_limit may be set for each carrier/pool, but when CR combining indicated for some carriers/pools, the CR_limits set for the respective carriers/pools may be summed to obtain and use the maximum, minimum, or (weighted) average as a carrier/pool-common CR_limit. In the out coverage case, carriers/pools on which CR combining is to be performed may be predetermined.

The above-described scheme may also be used when zone based pool selection of the UE is configured. For example, the CR in a pool configured for zone A and the CR in a pool configured for zone B are not evaluated separately, but are summed and evaluated. According to this method, when the pool is changed due to change in location of the UE, excessive transmission at the initial state of change of the pool may be prevented from occurring because the transmission does not exist in the period for evaluating the CR and the CR is evaluated as 0.

In combining CRs, weights may be given according to CBR or to specific carriers. For example, carrier A may be assigned a weight of 1.2 and carrier B may be assigned a weight of 0.8 to combine the carries, and the result of the combination may be compared with CR_limit. This is intended to induce use of a specific carrier by rating the CR of the carrier high (or low). Such carrier-specific weights may be determined in association with the CBR or may be signaled by the network through a physical layer signal or a higher layer signal. For example, when the CR weight is linked to the CBR, a carrier having a lower CBR may be assigned a lower weight to induce use of a specific carrier.

While it is assumed in the scheme above that CBR is measured on each carrier/pool, combining CBRs between carriers/pools may also be considered. In this case, the combination of the CBRs may be the maximum, minimum, (weighted) average, or summation of the CBR values measured on different carriers/pools, and the transmission parameters are determined using the CBR value calculated through the combination of the CBRs. In this method, even if a carrier is selected based on the CBR, the transmission parameters are set based on the combined CBR value. In addition, the transmission parameters are determined, assuming the same load for carriers/pools supporting the same type of service.

In this regard, the network may signal a carrier/pool on which CBR combining is to be performed to the UE through a physical layer signal or a higher layer signal. For a UE out of the coverage, such a configuration may be predetermined.

The combination of CBRs may be configured separately from the combination of CRs. For example, the CBRs may not be combined, only CRs may be combined. Alternatively, both CBR combining and CR combining may be performed.

If the combining is always performed on all carries for which the CR/CBR is configured, this can be interpreted as meaning that the CR/CBR is measured/evaluated for each UE. This configuration may be predetermined without separate signaling. The network may signal information indicating whether the UE is to measure/evaluate CBR/CR for each carrier/pool or the CBR/CR is to measured/evaluated for each UE, through a physical layer signal or a higher layer signal.

<Second Approach>

Although the CBR and CR are measured/evaluated for each carrier/pool, it is proposed that a higher priority be assigned to a carrier/pool with a lower CBR in terms of the CR or CR_limit which is a metric for carrier/pool selection.

For example, a CR which is a metric for carrier/pool selection may not be a simple CR, but may select a carrier/pool having the least value of a product of the CR and CBR or select a carrier/pool having a product value less than a certain threshold. Alternatively, a weight according to CBR may be applied to CR_limit of each carrier/pool, and a higher CR may be allowed in a pool with a lower CBR. As another method, a weight factor may be configured by dividing a CBR by the sum of the CBRs for the respective carriers/pools, and a carrier/pool for which the least value is obtained when the weight factor is multiplied by CR may be selected.

When the CR/CBR is measured/evaluated for each carrier/pool, the UE selects a carrier/pool based on the CBR. Here, if the CR in a specific pool exceeds a threshold, the carrier/pool is changed. In order for the UE to persistently use a pool having a low CBR (i.e., a low-load pool), the CR evaluation condition used for the carrier/pool selection may be eased according to the CBR.

<Third Approach>

With a CR limiting operation for each carrier/pool applied, an across-carrier or across-pool CR limiting operation may be applied. To this end, the network may signal, to the UE, CR_limit for across-carrier or across-pool CR limiting and the index of a carrier or a pool excluded as it is subjected to the across-carrier or across-pool CR limiting, or such value may be predetermined.

If only the across-carrier or across-pool CR limiting operation is applied, only one carrier with a high CBR may be intensively used. However, if the CR limiting operation for each carrier/pool is redundantly applied, the load may be distributed to multiple carriers/pools.

<Fourth Approach>

Finally, when the UE selects a carrier with a low CBR, if there is no resource to select from the carrier, as in a case where the CR of the corresponding carrier is greater than or equal to a certain threshold, a case where the difference between the CR and the CR_limit is less than a certain threshold, or a case where the CR reaches CR_limit, it is proposed that the carrier be excluded from carrier selection.

To this end, a CR margin which is a difference between the current CR and the CR_limit may be defined. Only when the CR margin is greater than or equal to a predetermined threshold, the corresponding carrier may be included in the set of selectable carriers. That is, when the CR margin is less than the predetermined threshold, the carrier may be excluded from the set of selectable carriers. This threshold of the CR margin may be predetermined or signaled by the network through a physical layer signal or a higher layer signal.

Since the CR is determined for each resource pool, the UE may calculate a CR margin for each resource pool configured on a carrier. In this case, the CR margin of the carrier may be the sum, maximum, minimum, or average of the CR margins per pool, or may be a CR margin of a pool available at the current location of the UE. For example, if the location-based resource pool configuration scheme described in section 5.10.13.2 of 3GPP Release 14 TS 36.331 is introduced (where the location-based resource pool configuration scheme refers to predetermining a pool to be used according to the location of the UE), a CR margin for the resource pool may be calculated on each carrier. In this case, the sum, average, maximum, or minimum of the CR margins for the respective pools may be a CR margin for carrier selection of the corresponding carrier, or the CR margin of a pool according to the current location of the UE may be the CR margin of the corresponding carrier.

In this method, a carrier is selected based on the CBR. However, when there is no margin in the CR of the carrier, the carrier may be excluded from the selection, thereby enabling a carrier having the next CBR to be naturally selected.

Alternatively, the UE may give a weight as large as the CR margin in selecting a carrier based on the CBR. For example, the product of the CBR and the CR margin may be a metric for carrier selection.

Figure 11:
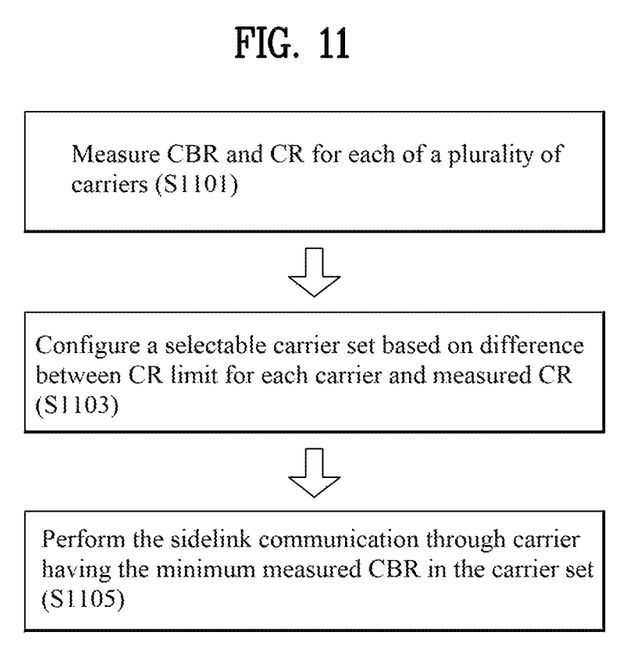
FIG. 11 is a flowchart illustrating a method for selecting a carrier for direct communication between user equipments in a multi-carrier communication system according to an embodiment of the present invention.

FIG. 11 is a flowchart illustrating a method for selecting a carrier for direct communication between user equipments in a multi-carrier communication system according to an embodiment of the present invention.

Referring to FIG. 11, in step 1101, for each of a plurality of carriers, the UE measures a channel busy ratio (CBR) representing a ratio of total resources of a corresponding carrier and resources already used for a predetermined period, and a channel occupancy ratio (CR) representing the amount of resources used by the UE on the corresponding carrier during the predetermined period. In particular, the measured CR may be a CR average of a plurality of resource pools configured on the corresponding carrier. Alternatively, in the case where the location-based resource pool configuration scheme is introduced, the measured CR may be a CR average of resource pools available at the location of the UE among a plurality of resource pools configured on the corresponding carrier.

Next, in step 1103, the UE configures a set of selectable carriers based on a difference between the CR limit for each carrier and the measured CR for each of the plurality of carriers. More specifically, the set of selectable carriers is composed of carriers for which a difference between the CR limit for each carrier and the measured CR is greater than or equal to a threshold. Here, information about the CR limit for each carrier and the threshold may be pre-provided from the network.

Finally, in step 1105, the UE performs sidelink communication through a carrier having the minimum CBR measured in the carrier set.

Figure 12:
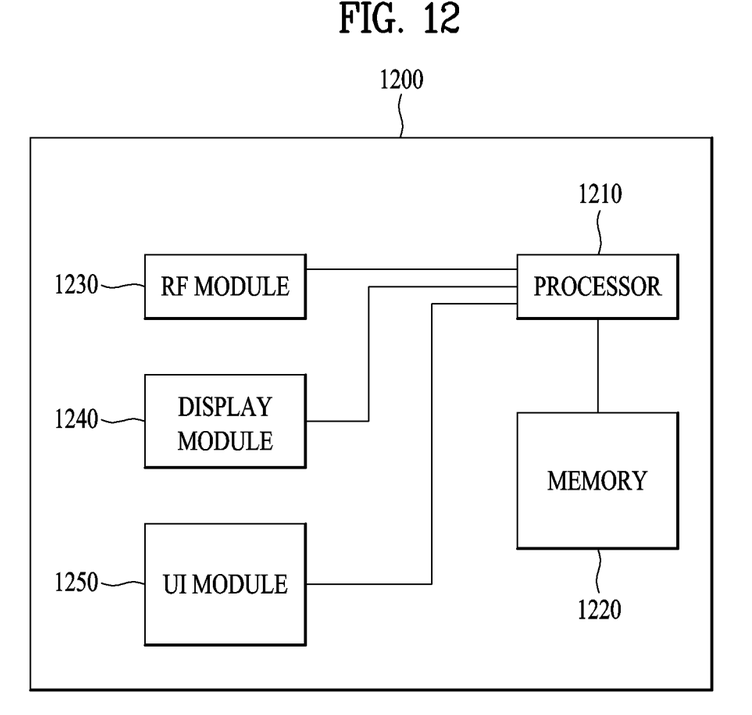
FIG. 12 is a diagram showing configurations of communication devices according to an embodiment of the present invention.

FIG. 12 is a block diagram of a communication apparatus according to an embodiment of the present invention.

Referring to FIG. 12, a communication apparatus 1200 includes a processor 1210, a memory 1220, an RF module 1230, a display module 1240, and a User Interface (UI) module 1250.

The communication device 1200 is shown as having the configuration illustrated in FIG. 12, for the convenience of description. Some modules may be added to or omitted from the communication apparatus 1200. In addition, a module of the communication apparatus 1200 may be divided into more modules. The processor 1210 is configured to perform operations according to the embodiments of the present invention described before with reference to the drawings. Specifically, for detailed operations of the processor 1210, the descriptions of FIGS. 1 to 11 may be referred to.

The memory 1220 is connected to the processor 1210 and stores an Operating System (OS), applications, program codes, data, etc. The RF module 1230, which is connected to the processor 1210, upconverts a baseband signal to an RF signal or downconverts an RF signal to a baseband signal. For this purpose, the RF module 1230 performs digital-to-analog conversion, amplification, filtering, and frequency upconversion or performs these processes reversely. The display module 1240 is connected to the processor 1210 and displays various types of information. The display module 1240 may be configured as, not limited to, a known component such as a Liquid Crystal Display (LCD), a Light Emitting Diode (LED) display, and an Organic Light Emitting Diode (OLED) display. The UI module 1250 is connected to the processor 1210 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method for selecting, by a terminal, a carrier for sidelink communication in a multi-carrier communication system, the method comprising:

receiving, from a network, information about a channel occupancy ratio (CR) limit for each of a plurality of carriers;

measuring, for each of the plurality of carriers, (i) a channel busy ratio (CBR) representing a ratio of entire resources of a corresponding carrier and resources already used for a predetermined period, and (ii) a CR representing a ratio of the entire resources of the corresponding carrier and resources used by the terminal on the corresponding carrier during the predetermined period;

configuring, for each of the plurality of carriers, a set of selectable carriers based on a difference between a biased CR limit for each carrier and the measured CR; and performing the sidelink communication through a carrier having the minimum measured CBR in the carrier set, wherein the biased CR limit for each carrier is defined by multiplying the measured CR for each carrier and the CR limit for each carrier.

2. The method of claim 1, wherein the measured CR is a CR average value of a plurality of resource pools configured for the corresponding carrier.

3. The method of claim 1, wherein the measured CR is a CR average of resource pools available at a location of the terminal among a plurality of resource pools configured for the corresponding carrier.

4. The method of claim 1, wherein the configuring of the set of selectable carriers comprises:

configuring the selectable carrier set with carriers having a difference between the biased CR limit for each carrier and the measured CR greater than or equal to a threshold.

5. A terminal for performing sidelink communication in a multi-carrier communication system, comprising:

a wireless communication module; and a processor connected to the wireless communication module, wherein the processor is configured to:

receive, from a network, information about a channel occupancy ratio (CR) limit for each of a plurality of carriers;

measure, for each of the plurality of carriers, (i) a channel busy ratio (CBR) representing a ratio of entire resources of a corresponding carrier and resources already used for a predetermined period, and (ii) a CR representing a ratio of the entire resources of the corresponding carrier and resources used by the terminal on the corresponding carrier during the predetermined period;

configure, for each of the plurality of carriers, a set of selectable carriers based on a difference between a biased CR limit for each carrier and the measured CR; and perform the sidelink communication through a carrier having the minimum measured CBR in the carrier set, wherein the biased CR limit for each carrier is defined by multiplying the measured CR for each carrier and the CR limit for each carrier.

6. The terminal of claim 5, wherein the measured CR is a CR average value of a plurality of resource pools configured for the corresponding carrier.

7. The terminal of claim 5, wherein the measured CR is a CR average of resource pools available at a location of the terminal among a plurality of resource pools configured for the corresponding carrier.

8. The terminal of claim 5, wherein the processor is configured to configure the selectable carrier set with carriers having a difference between the biased CR limit for each carrier and the measured CR greater than or equal to a threshold.

9. At least one computer-readable memory storing instructions that, based on being executed by a processor, control a terminal to perform operations for sidelink communication in a multi-carrier communication system, the operations comprising:

receiving, from a network, information about a channel occupancy ratio (CR) limit for each of a plurality of carriers;

measuring, for each of the plurality of carriers, (i) a channel busy ratio (CBR) representing a ratio of entire resources of a corresponding carrier and resources already used for a predetermined period, and (ii) a CR representing a ratio of the entire resources of the corresponding carrier and resources used by the terminal on the corresponding carrier during the predetermined period;

configuring, for each of the plurality of carriers, a set of selectable carriers based on a difference between a biased CR limit for each carrier and the measured CR; and performing the sidelink communication through a carrier having the minimum measured CBR in the carrier set, wherein the biased CR limit for each carrier is defined by multiplying the measured CR for each carrier and the CR limit for each carrier.

10. The at least one computer-readable memory of claim 9, wherein the measured CR is a CR average value of a plurality of resource pools configured for the corresponding carrier.

11. The at least one computer-readable memory of claim 9, wherein the measured CR is a CR average of resource pools available at a location of the terminal among a plurality of resource pools configured for the corresponding carrier.

12. The at least one computer-readable memory of claim 9, wherein the configuring of the set of selectable carriers comprises:

configuring the selectable carrier set with carriers having a difference between the biased CR limit for each carrier and the measured CR greater than or equal to a threshold.

* * * * *